United States Patent
Miyazaki

(10) Patent No.: US 7,588,515 B2
(45) Date of Patent: Sep. 15, 2009

(54) FUEL INJECTION CONTROLLER OF INTERNAL COMBUSTION ENGINE

(75) Inventor: Satoshi Miyazaki, Kariya (JP)

(73) Assignee: DENSO Corporation, Kariya (JP)

(*) Notice: Subject to any disclaimer, the term of this patent is extended or adjusted under 35 U.S.C. 154(b) by 349 days.

(21) Appl. No.: 11/484,633

(22) Filed: Jul. 12, 2006

(65) Prior Publication Data
US 2007/0015630 A1    Jan. 18, 2007

(30) Foreign Application Priority Data
Jul. 12, 2005 (JP) .............................. 2005-202835

(51) Int. Cl.
*B60W 10/10* (2006.01)
*B60T 7/12* (2006.01)

(52) U.S. Cl. ...................... 477/111; 701/104

(58) Field of Classification Search ................ 477/107, 477/111, 101; 701/103, 104; 73/114.45, 73/114.46, 114.48, 114.51, 116.02; 123/339.19, 123/339.2
See application file for complete search history.

(56) References Cited

U.S. PATENT DOCUMENTS

| | | | | |
|---|---|---|---|---|
| 5,995,899 A | * | 11/1999 | Miwa | 701/104 |
| 6,085,142 A | * | 7/2000 | Di Leo et al. | 701/104 |
| 6,374,800 B2 | * | 4/2002 | Saiki | 123/339.19 |
| 6,755,176 B2 | | 6/2004 | Takeuchi et al. | |
| 7,333,886 B2 | * | 2/2008 | Bohnig et al. | 701/114 |
| 2005/0178358 A1 | * | 8/2005 | Nakane | 123/339.19 |

FOREIGN PATENT DOCUMENTS

| | | | |
|---|---|---|---|
| JP | 02283836 A | * | 11/1990 |
| JP | 04066742 A | * | 3/1992 |
| JP | 11-36953 | | 2/1999 |
| JP | 2002/201995 | | 7/2002 |
| JP | 2003/120356 | | 4/2003 |

OTHER PUBLICATIONS

Office Action issued Jul. 10, 2009 in corresponding Japanese Application No. 2005-202835 with an at least partial English language translation.

* cited by examiner

*Primary Examiner*—Roger Pang
(74) *Attorney, Agent, or Firm*—Nixon & Vanderhye P.C.

(57) ABSTRACT

A crankshaft of an internal combustion engine is connected to an automatic transmission mechanism through a torque converter. A difference in a load applied to the crankshaft between a D range and a P range is sensed based on a difference in a command fuel injection amount during idling stabilization control between the D range and the P range. A difference between a fuel amount required by learning control of pilot fuel injection in the D range and a standard command fuel injection amount required for performing the learning control under the load corresponding to the p range is reduced by a fuel injection amount difference caused by the difference of the load. A learning value of the pilot injection is learned based on the reduced difference.

4 Claims, 8 Drawing Sheets

| OPERATION | LOAD | INJECTION PATTERN |
|---|---|---|
| IDLING STABILIZATION | L0 |  |
|  | L1 |  |
| PILOT LEARNING | L0 |  |
|  | L1 |  |

FUEL INJECTION CONTROLLER OF INTERNAL COMBUSTION ENGINE

CROSS-REFERENCE TO RELATED APPLICATION

This application is based on and incorporates herein by reference Japanese Patent Application No. 2005-202835 filed on Jul. 12, 2005.

BACKGROUND OF THE INVENTION

1. Field of the Invention

The present invention relates to a fuel injection controller of an internal combustion engine connectable with driving wheels through a connecting device, the fuel injection controller learning a learning value of an operation amount of a fuel injection valve in order to compensate for a difference between a desired fuel injection amount and an actual fuel injection amount when controlling fuel injection of the fuel injection valve.

2. Description of Related Art

Prior to a main injection, a known diesel engine performs multiple pilot injections with a fuel injection valve for injecting smaller fuel amounts than the main injection to restrict combustion noises or to improve exhaust emission characteristics. A variation can be caused in the actual fuel injection amounts actually injected by the fuel injection valve due to ageing of the fuel injection valve, variations in the manufacture of the fuel injection valve or the like even if an operation amount such as a drive pulse width or a command fuel injection amount of the fuel injection valve is set at a constant value to control the fuel injection. Since the fuel injection amount of the pilot injection is much smaller than that of the main injection, it is difficult to sufficiently achieve the above objects if the actual fuel injection amount differs from the desired fuel injection amount.

A fuel injection controller described in JP-A-2003-254139 feedback-controls actual rotation speed of an engine to target rotation speed by performing n times of equally divided injections and learns a learning value of an operation amount of a fuel injection valve for compensating for a difference between a desired fuel injection amount and an actual fuel injection amount based on the operation amount of the fuel injection valve at the time of the feedback control. This fuel injection controller can obtain fuel injection characteristics in the fuel injection of an extremely small fuel amount such as a pilot injection through the n times of equally divided fuel injections and resultantly obtain an appropriate learning value.

This fuel injection controller performs the feedback control under an unloaded operating condition of the engine where no load is applied to an engine output shaft. Therefore, it is difficult to ensure a learning frequency. Further, this problem is not limited to the fuel injection controller that learns a learning value of the pilot fuel injection, but is common to a fuel injection controller that performs a fuel injection of an extremely small amount.

SUMMARY OF THE INVENTION

It is an object of the present invention to provide a fuel injection controller of an internal combustion engine that ensures a sufficient frequency of learning a learning value of an operation amount of a fuel injection valve to compensate for a difference between a desired fuel injection amount and an actual fuel injection amount injected by the fuel injection valve.

According to an aspect of the present invention, a fuel injection controller of an internal combustion engine includes a learning control device, a load sensor, a memory, a determination device and a learning device. The learning control device feedback-controls a rotation state of an output shaft of an engine to a target rotation state by performing fuel injection with a preset pattern in which a relation between the number of fuel injection steps and fuel injection amounts of the fuel injection steps is preset. The load sensor senses a load applied to the output shaft by a connecting device based on a behavior of the output shaft accompanying the fuel injection with a pattern different from the preset pattern. The memory stores processing information for learning the learning value based on a difference between an operation amount of the fuel injection valve required in the feedback control performed by the learning control device and a standard operation amount, the difference being reduced by its component caused by a difference between a load applied to the output shaft by the connecting device during the feedback control and a load expected with the standard operation amount of the fuel injection valve. The determination device determines whether there exists a certain state in which a load substantially equal to the load applied to the output shaft by the connecting device during the feedback control is applied to the output shaft. The learning device learns the learning value by reflecting a sensing result of the load sensor in the case where the determination device determines that the certain state exists in the processing information.

With this structure, the difference between the desired fuel injection amount and the actual fuel injection amount is reflected in the difference between the operation amount required during the feedback control of the learning control device and the standard operation amount. It is assumed that the target rotation state is realized by the standard operation amount. Therefore, if the actual operation amount during the feedback control deviates from the standard operation amount, it can be assumed that the actual fuel injection amount differs from the desired fuel injection amount. The actual fuel injection amount required for controlling the actual rotation state to the target rotation state varies depending on a load applied to the output shaft. Therefore, the target rotation state can be realized with the standard operation amount under a condition that the load applied to the output shaft is constant.

In the above structure, the load sensor senses the load when it is determined that the load applied to the output shaft by the connecting device is substantially the same as the load applied during the feedback control performed by the learning control device. Therefore, the sensed load is considered substantially the same as the load applied during the feedback control performed by the learning control device. Accordingly, the difference in the load from the load expected with the standard operation amount can be obtained based on the sensed load. Therefore, the difference between the desired fuel injection amount and the actual fuel injection amount can be obtained from a difference between the operation amount required by the learning control device and the above-obtained load, so the learning value can be calculated accurately. Further, since the learning value is learned by indirectly sensing the load during the feedback control performed by the learning control device, the learning value can be learned during other operating conditions than an unloaded operating condition, so a sufficient learning frequency can be ensured.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
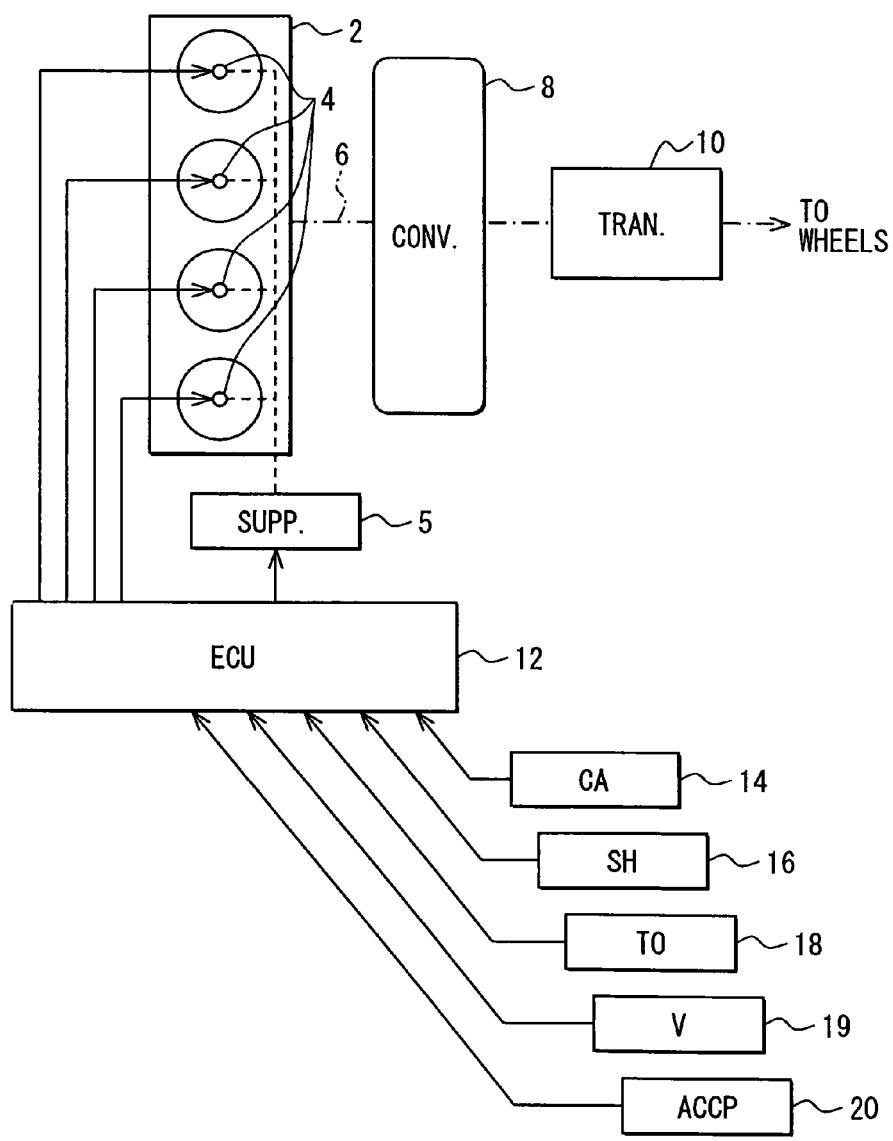
FIG. 1 is a block diagram showing an engine system according to a first example embodiment of the present invention.

Referring to FIG. 1, an engine system including a diesel engine as an internal combustion engine equipped with a fuel injection controller according to a first example embodiment of the present invention is illustrated. As shown in FIG. 1, fuel injection valves 4 are located in respective cylinders (four cylinders in the present embodiment) of an internal combustion engine 2. Fuel is supplied to the fuel injection valve 4 from a fuel supply device 5. A supply path of the fuel is shown by a broken line in FIG. 1. For example, the fuel supply device 5 may include a fuel tank, a high-pressure fuel pump for drawing fuel from the fuel tank and discharging the drawn fuel in a high-pressure state, and a common rail for storing the fuel supplied by the high-pressure pump in a high-pressure state. An output shaft (crankshaft) 6 of the engine 2 is connected to an automatic transmission (AT) equipped with a fluid friction connecter (torque converter) 8 and an automatic transmission mechanism 10. The automatic transmission mechanism 10 has a planetary gear mechanism, a clutch, a brake and the like to output an input while changing its rotational state. The crankshaft 6 is connectable with driving wheels of a vehicle through the torque converter 8 and the automatic transmission mechanism 10.

An electronic control unit (ECU) 12 has a microcomputer and drives various actuators of the engine 2 such as the fuel injection valves 4 and the fuel supply device 5 based on various pieces of information input by external components to control an output of the engine 2. The various pieces of the information include sensing values of various sensors for sensing operation states of the engine system such as a crankshaft sensor 14 for sensing a rotational angle CA of the crankshaft 6, a shift position sensor 16 for sensing a shift position SH of the automatic transmission mechanism 10, an oil temperature sensor 18 for sensing oil temperature TO of operating oil of the automatic transmission mechanism 10 and a vehicle speed sensor 19 for sensing a running speed V of a vehicle. The shift position includes a parking (P) range, a reverse (R) range, a neutral (N) range, a drive (D) range and the like. These ranges are realized through an operation of the automatic transmission mechanism 10 performed by an electronic control unit (not shown) for the AT. The various pieces of the information further include information from a user interface 20. The user interface 20 includes an accelerator pedal ACCP with which a user instructs acceleration.

Figure 2:
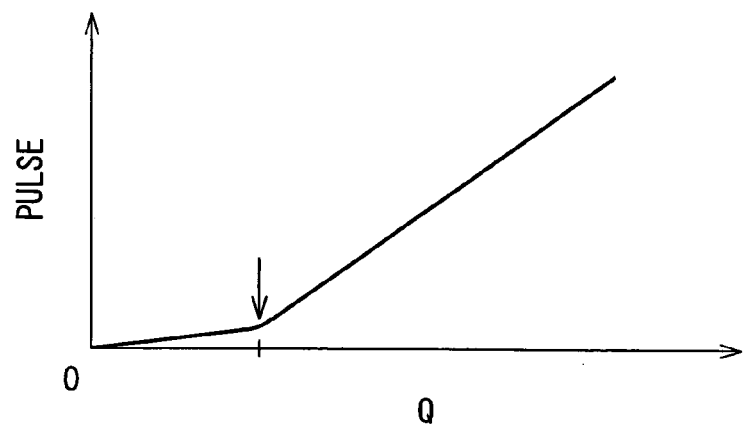
FIG. 2 is a graph showing a relation between a command fuel injection amount and a drive pulse according to the FIG. 1 embodiment.

Next, a fuel injection control performed by the ECU 12 will be explained. The ECU 12 operates the fuel injection valves 4 for performing fuel injection control based on the above various pieces of the information. An operation amount of each fuel injection valve 4 is normally a drive pulse instructing a fuel injection period for injecting the fuel from the fuel injection valve 4. A one-to-one relation exists between a command fuel injection amount Q as a command value of the fuel injection amount and the fuel injection period (drive pulse) as shown in FIG. 2. Therefore, the drive pulse is set in accordance with the command fuel injection amount Q based on the above pieces of the information. According to FIG. 2, the fuel injection period is lengthened as the command fuel injection amount Q increases.

The actual fuel injection valve 4 has variations in fuel injection characteristics due to an individual difference or an ageing change. Therefore, even if the drive pulse of the fuel injection valve 4 is fixed, an actual fuel injection amount injected from the fuel injection valve 4 does not necessarily coincide with a desired fuel injection amount. In particular, in a fuel injection of an extremely small amount such as a pilot injection out of the multiple fuel injections used in the fuel injection control of the engine 2, a difference between the actual fuel injection amount of the fuel injection valve 4 and the desired fuel injection amount possibly raises the problem in the fuel injection control. Specifically, in the case where the injection characteristic shown in FIG. 2 exists between the drive pulse and the fuel injection amount Q, the above difference between the actual fuel injection amount and the desired fuel injection amount is likely to cause the problem because an increase of the fuel injection amount Q with respect to an increase of the drive pulse changes largely at a point shown by an arrow in FIG. 2. In the example of FIG. 2, control accuracy for achieving a desired fuel injection amount is likely to deteriorate particularly in a region where the drive pulse is relatively small.

It is desirable to learn a learning value to compensate for a difference generated between the desired fuel injection amount and the actual fuel injection amount due to variations in fuel injection characteristic during the fuel injection control. However, when a multi-step fuel injection is performed, a maim injection largely affects the rotational state of the engine 2. Therefore, it is difficult to learn a learning value of the minute amount injection.

Therefore, in the present embodiment, divided fuel injections of substantially equal fuel injection amounts are performed as the fuel injection for feedback-controlling actual rotation speed to target rotation speed. This allows the multiple fuel injections to apply substantially equal influences to the rotational state of the engine 2 respectively. In addition, a learning value for compensating for variations in the fuel injection characteristic can be learned based on a difference between a predetermined standard command injection amount and a command injection amount required in the feedback control.

However, the difference itself is not suitable as the learning value because a load applied to the crankshaft 6 fluctuates. Therefore, in the present embodiment, the learning value is learned based on the difference between the standard command injection amount and the required command injection amount, the difference being reduced by its component caused by a difference between the load applied to the crankshaft 6 during the feedback control and the load expected with the standard command injection amount.

Figure 3:
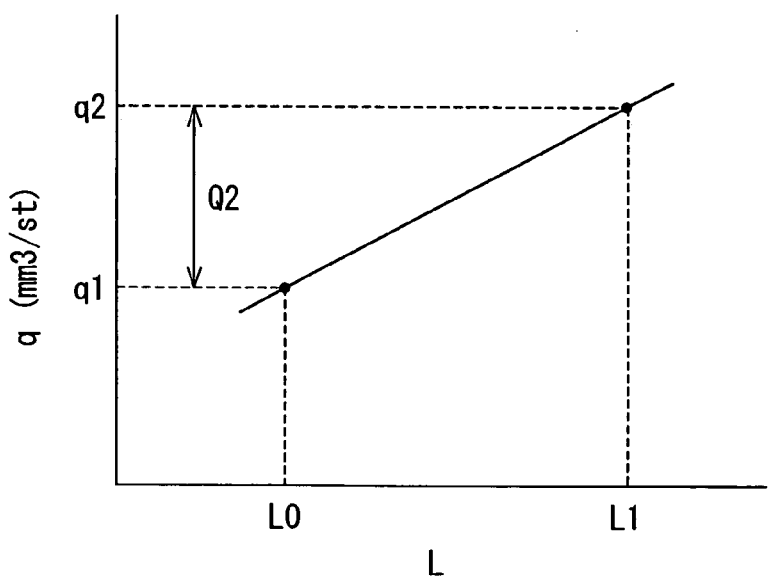
FIG. 3 is a graph showing a relation between a fuel injection amount required in idling stabilization control and a load according to the FIG. 1 embodiment.
Figure 4:
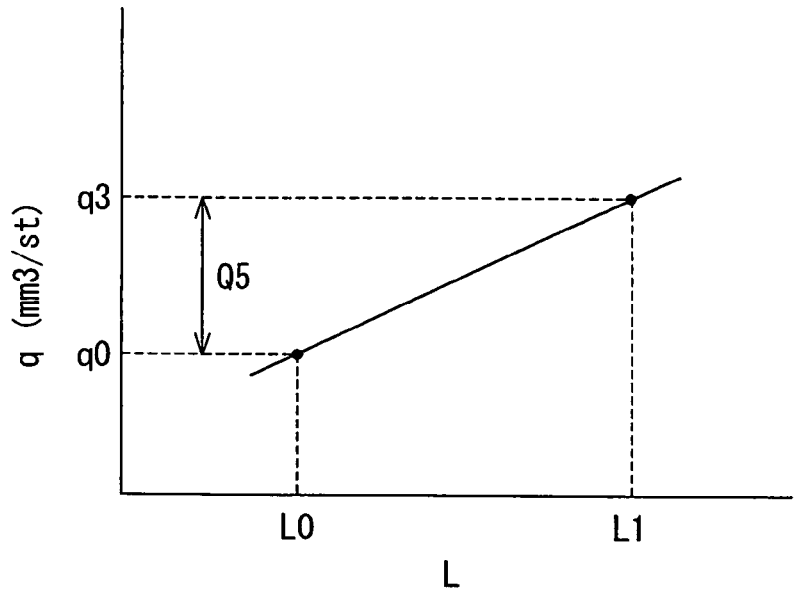
FIG. 4 is a graph showing a relation between a fuel injection amount required in pilot learning control and a load according to the FIG. 1 embodiment.

As shown in FIG. 3, a total injection amount q required in idling stabilization control for feedback-controlling actual rotation speed to target rotation speed in idling operation increases as a load L applied to the crankshaft 6 increases. As shown in FIG. 4, the total fuel injection amount q required in the feedback control (pilot learning control) for controlling the actual rotation speed to the target rotation speed by performing multiple fuel injections of substantially equal fuel injection amounts increases as the load L applied to the crankshaft 6 increases. Therefore, a difference Q2 between the total fuel injection amount q1 in an unloaded condition L0 where no load is applied to the crankshaft 6 and the total fuel injection amount q2 in a constant load condition L1 where a constant load L1 is applied to the crankshaft 6 in the idling stabilization control is correlated with a difference Q5 between the total fuel injection amount q0 in an unloaded condition L0 and the total fuel injection amount q3 in a constant load condition L1 in the pilot learning control. The total fuel injection amount difference Q5 required in the learning control increases as the total fuel injection amount difference Q2 required in the idling stabilization control increases.

Figure 6:
FIG. 6 is a table showing fuel injection patterns according to the FIG. 1 embodiment.
Figure 6:
Figure 6:
Figure 6:

FIG. 6 is a diagram of a fuel injection pattern showing this correlation. As shown in FIG. 6, in the idling stabilization control, a pilot injection p (one step pilot injection is shown as an example) and a main injection m are performed. A total fuel injection amount of the pilot injection p and the main injection m is greater in the case where a constant load L1 is applied to the crankshaft 6 than in the case where no load (L0=0) is applied to the crankshaft 6. In the pilot learning control, a total fuel injection amount of multiple fuel injections (five injections are employed as an example) of substantially equal fuel injection amounts is greater in the case where a constant load L1 is applied to the crankshaft 6 than in the case where no load is applied to the crankshaft 6.

Figure 5:
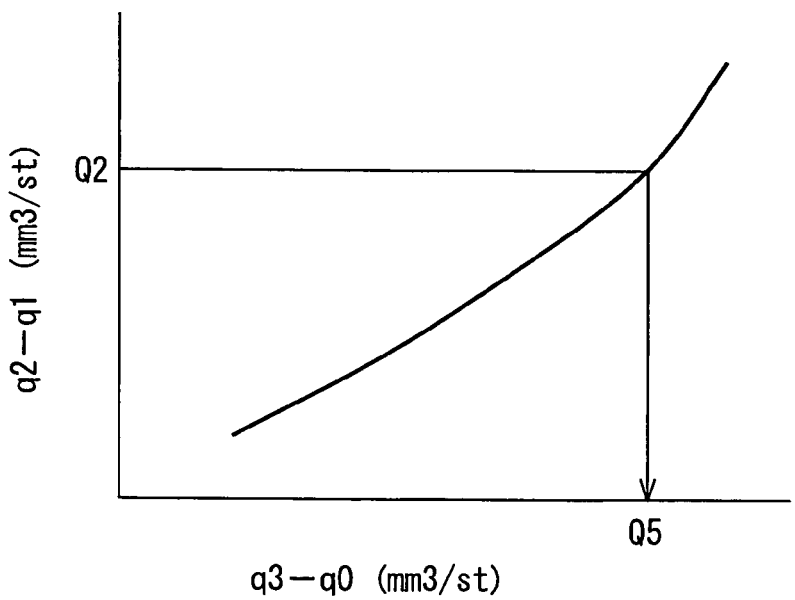
FIG. 5 is a graph showing a relation between injection amount differences in the idling stabilization control and the pilot learning control according to the FIG. 1 embodiment.
Figure 7:
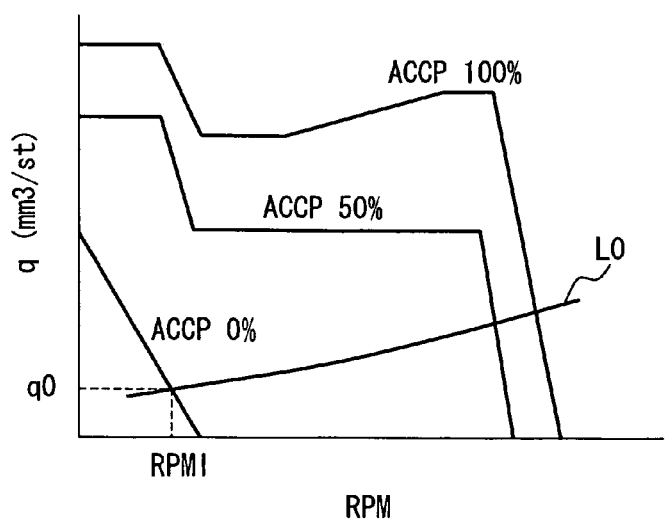
FIG. 7 is a graph showing a fuel injection amount under an unloaded condition according to the FIG. 1 embodiment.
Figure 8:
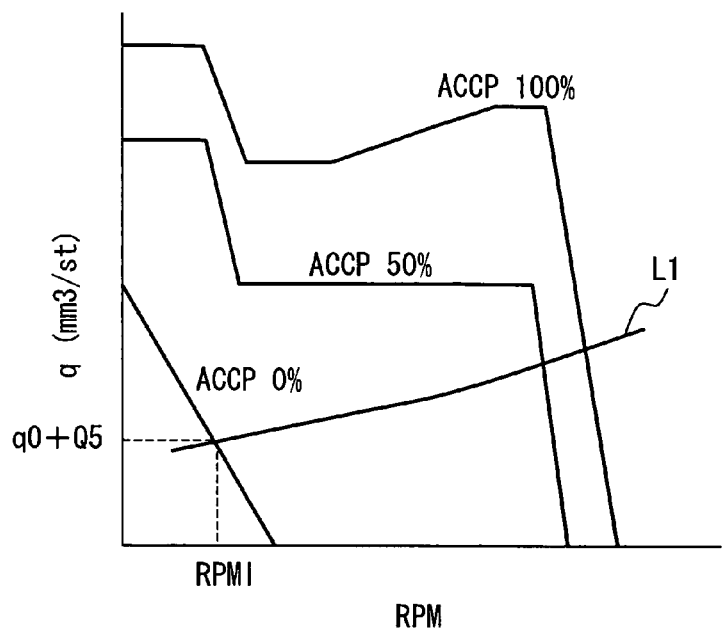
FIG. 8 is a graph showing a fuel injection amount under a constant load condition according to the FIG. 1 embodiment.

The injection amount difference Q5 in the pilot learning control between the unloaded condition L0 and the constant load condition L1 can be calculated from the fuel injection amount difference Q2 in the idling stabilization control between the unloaded operating condition L0 and the constant load operating condition L1 based on a map beforehand drafted by determining the correlation shown in FIG. 5 through experiments or the like. As shown in FIG. 8, the total fuel injection amount (q0+Q5) at the constant load condition L1 can be obtained by adding the fuel injection amount difference Q5 to the total fuel injection amount (standard fuel injection amount) q0 of the unloaded condition L0 during the pilot learning control shown in FIG. 7. A solid line L0 in FIG. 7 represents an unloaded curve. A solid line L1 in FIG. 8 represents a constant load curve. A sign RPMI in FIGS. 7 and 8 represents idling rotation speed.

In the first example embodiment, a state where a gearshift of the automatic transmission mechanism 10 is positioned in the parking range (P) corresponds to the unloaded condition L0 and a state where the gearshift is positioned in the drive range (D) corresponds to the constant load condition L1. The learning frequency is ensured by performing the pilot learning control during the idling stabilization control at the D range.

Figure 9:
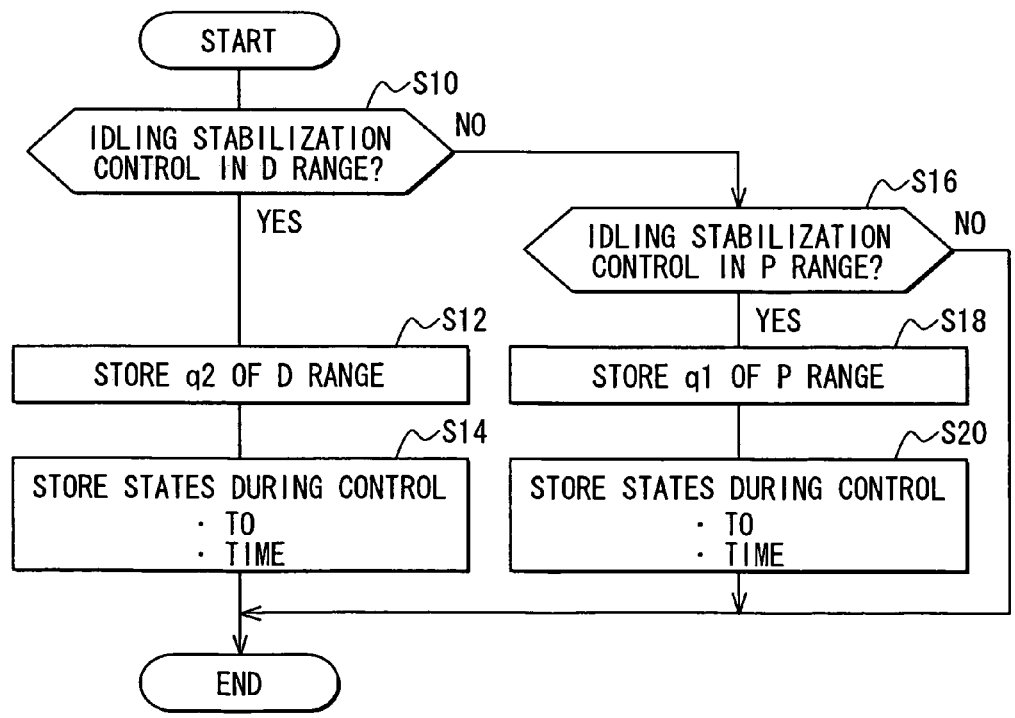
FIG. 9 is a flowchart showing processing steps of at the idling stabilization control according to the FIG. 1 embodiment.

Next, processing of the learning control of the pilot injection amount based on the above principle will be explained. FIG. 9 is a flowchart showing processing steps for sensing a difference in the command fuel injection amount during the idling stabilization control. The ECU 12 repeatedly executes this processing in a predetermined cycle.

First in a series of the processing steps, Step S10 determines whether the idling stabilization control is performed in the D range. When the idling stabilization control is performed in the D range, Step S12 stores a fuel injection amount q2 at the time when engine rotation speed RPM coincides with target rotation speed. The fuel injection amount q2 is a sum of a command fuel injection amount of the pilot injection p and a command fuel injection amount of the main injection m in the fuel injection pattern during the idling stabilization control shown in FIG. 6. This idling stabilization control also performs control to compensate for a variation in engine rotation speed due to a variation in combustion energy of the cylinders. The idling stabilization control stores a fuel injection amount of the fuel injection valve 4 of each cylinder individually.

Next, Step S14 stores states that can specifically cause a fluctuation of a load applied to the crankshaft 6 when the idling stabilization control is performed. The states include the oil temperature TO sensed by the oil temperature sensor 18, the time when the processing at Step S12 is performed or the like. The oil temperature TO is a factor that fluctuates a viscosity coefficient of a viscous fluid (operating oil) in the torque converter 8. Therefore, the load applied to the crankshaft 6 by the torque converter 8 varies if the oil temperature TO varies. The time is a parameter indicating a degradation degree of the operating oil. The load applied to the crankshaft 6 by the torque converter 8 varies also with the degradation of the operating oil. The oil temperature sensor 18 senses the oil temperature TO of the operating oil in the automatic transmission mechanism 10 and the sensed value corresponds to temperature of the operating oil in the torque converter 8. The oil temperature TO and the time are updated every time the processing at Step S12 is executed.

If it is not determined at Step S10 that the shift position is in the D range and the idling stabilization control is in progress, Step S16 determines whether the shift position is in the P range and the idling stabilization control is in progress. If the answer to Step S16 is YES, Step S18 stores the injection amount q1 of the P range and Step S20 stores the states that can specifically cause a fluctuation of the load applied to the crankshaft 6 when the idling stabilization control is performed. If the processing at Steps S14 or S20 is completed or if the answer to Step S16 is NO, the series of the processing steps ends once.

Figure 10:
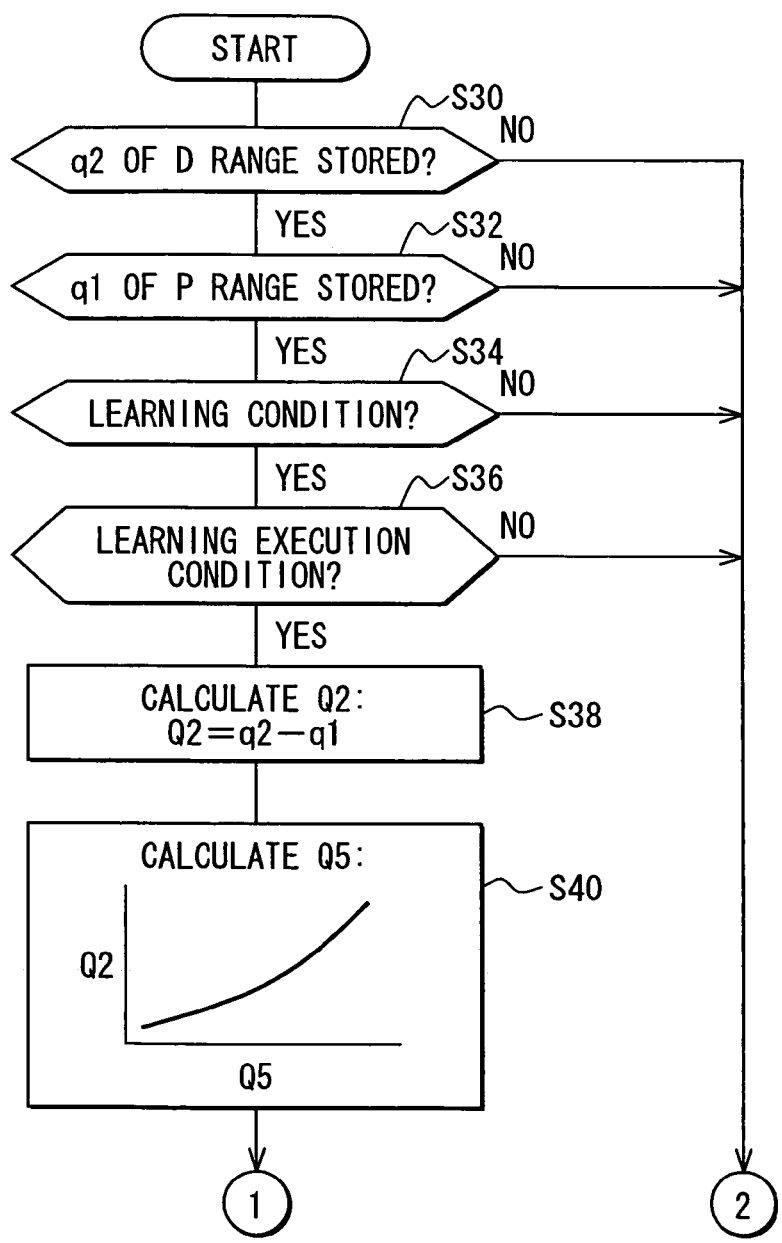
FIG. 10 is a flowchart showing processing steps of the pilot learning control according to the FIG. 1 embodiment.
Figure 11:
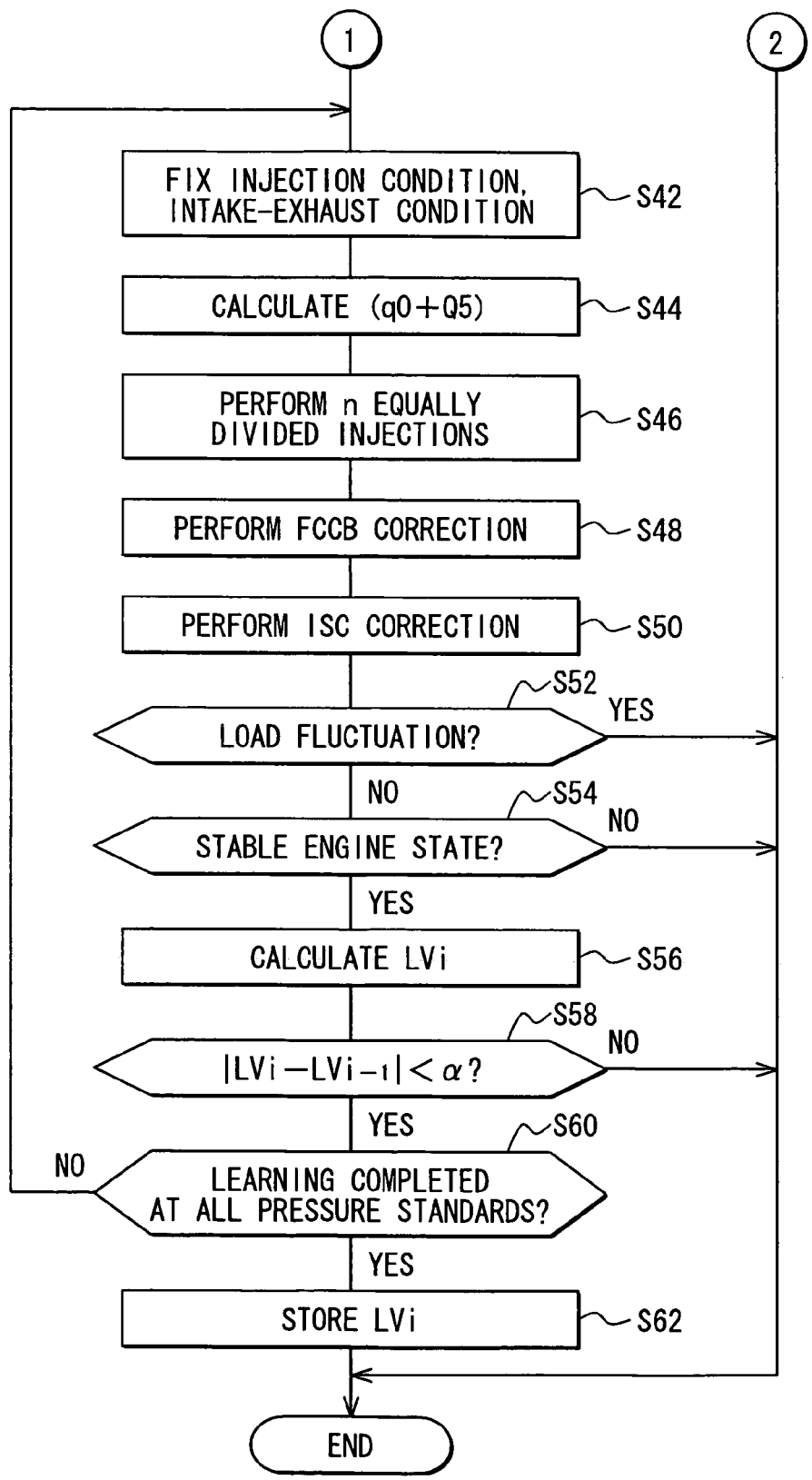
FIG. 11 is a flowchart showing the processing steps of the pilot learning control according to the FIG. 1 embodiment.

FIGS. 10 and 11 show a flowchart of processing steps in regard to the pilot learning control. The ECU 12 repeatedly executes this processing, for example, in a predetermined cycle. First in the series of the processing steps, Step S30 determines whether the process at Step S12 of FIG. 9, i.e., the process of storing the fuel injection amount q2 of the D range, is performed. If the answer to Step S30 is YES, the process goes to step S32. Step S32 determines whether the process at Step S18 of FIG. 9, i.e., the process of storing the fuel injection amount q1 of the P range, is performed. If the answer to Step S32 is YES, the process goes to Step S34. Step S34 determines whether a learning condition is met. This learning condition includes a condition that the pilot learning control can be performed and a condition that a fluctuation of the load applied to the crankshaft 6 is within an allowable range. The condition that the pilot learning control can be performed includes a condition that the vehicle speed V sensed by the vehicle speed sensor 19 is zero, a condition that the D range is detected by the shift positioning sensor 16, a condition that the accelerator pedal ACCP of the user interface is not depressed, or the like.

The condition that the fluctuation of the load applied to the crankshaft 6 is within the allowable range includes following conditions I and II.

Condition I: A difference between any pair of the oil temperature sensed by the oil temperature sensor 18 and two values of the oil temperature stored at Step S14 and Step S20 of FIG. 9 is within a predetermined range when the series of the processing steps is executed.

Condition II: A difference between any pair of the timing to perform the series of the processing and two timings to execute the processes at Steps S12 and S18 of FIG. 9 is within a certain range.

A condition that a headlight of the vehicle is not used or an in-vehicle air conditioner is not working may be employed in addition to the above conditions.

If the answer to Step S34 is YES, Step S36 determines whether a learning execution condition is met. Step S36 determines whether there exists a state where the learning control of the pilot injection is desired. That is, it is determined whether there exists a state where an aging change affecting the fuel injection characteristic of the fuel injection valve 4 can occur, for example, based on accumulation of driving hours of the engine 2 from the previous learning control. If the answer to Step S36 is YES, Step S38 calculates a difference Q2 between the fuel injection amount q2 of the D range stored at Step S12 of FIG. 9 and the fuel injection amount q1 of the P range stored at Step S18 of FIG. 9. Then, Step S40 calculates a difference Q5 in fuel injection amount between the D range and the P range at the time of the pilot learning control by using a map defining a correlation shown in FIG. 5, based on the difference Q2 in the fuel injection amounts q1, q2.

When the process at Step S40 is thus completed, the process goes to Step S42 of FIG. 11. Step S42 sets the fuel pressure supplied by the fuel supply device 5 to the fuel injection valves 4 and also fixes operating conditions of the engine 2 to predetermined conditions. The operating conditions include conditions such as an opening degree of a throttle valve or a target value of an EGR amount (exhaust gas recirculation amount) that fluctuate a fuel injection amount required when the actual rotation speed of the engine 2 is feedback-controlled to target rotation speed.

Then, Step S44 calculates a basic fuel injection amount as a sum of standard command fuel injection amounts required when the actual rotation speed is controlled to target rotation speed based on the fuel injection pattern of the pilot learning control shown in FIG. 6. The basic fuel injection amount is calculated by adding the difference Q5 in fuel injection amount calculated at step S40 of FIG. 10 to the sum q0 of the standard command fuel injection amounts expected in the P range.

Then, Step S46 equally divides the basic fuel injection amount (q0+Q5) into n divisions to perform the fuel injection separated n times. The fuel injection of the command injection amount obtained by adding the previous learning value to the injection amount of "1/n" of the basic injection amount (q0+Q5) is performed n times. Alternatively, the command injection amount may be corrected in consideration of an influence of an interval between the injections. The correction may be performed by a method described in JP-A-2003-254139.

Then, Step S48 performs inter-cylinder engine speed variation injection amount correction (fuel control cylinder balance correction: FCCB correction) for correcting the command injection amount of each cylinder (with a FCCB correction amount FCCB) to compensate for a variation in a fluctuation of the rotation speed of the crankshaft 6 due to the combustion energy in the cylinders. In detail, the injection amount of each one of the n times of fuel injections is corrected by a value FCCB/n obtained by dividing the FCCB correction amount FCCB by n. A detail of this processing may be performed by the method described in JP-A-2003-254139.

Then, Step S50 performs idling speed correction (ISC correction) for correcting the command injection amounts of all cylinders with the same ISC correction amount ISC to control averaged rotation speed of the crankshaft 6 to target rotation speed. In detail, the injection amount of each one of the n times of fuel injections is corrected with a value ISC/n obtained by dividing the ISC correction amount ISC by n. A detail of this processing may be performed by the method described in JP-A-2003-254139.

Then, Step S52 determines whether a state that fluctuates the load of the crankshaft 6 has occurred during a period from a point when it is determined that the learning condition is met at Step S34 of FIG. 10 to the present point. Then, Step S54 determines whether the operating condition of the engine 2 is stable. For example, Step S54 determines whether a change of the FCCB correction amount FCCB or the ISC correction amount ISC is within a predetermined range from a viewpoint that a series of the processing steps is carried out under each one of different fuel pressures supplied to the fuel injection valves 4.

Then, Step S56 calculates a learning value $LV_i$ under the present fuel pressure by adding the value FCCB/n and the value ISC/n to the previous learning value $LV_{i-1}$. Then, Step S58 determines whether a difference between the present learning value $LV_i$ and the previous learning value $LV_{i-1}$ is within a predetermined range α. Thus, a level of the calculation of the learning value $LV_i$ is determined. If the answer to Step S58 is YES, it is determined that the present learning value $LV_i$ is normal and the process goes to Step S60. Step S60 changes the pressure supplied to the fuel injection valves 4 to execute the processes of Steps S42 to S58. If the processes at Steps S42 to S58 are completed in regard to all of the set pressure standards, Step S62 writes the learning values newly learned this time into a non-volatile memory such as a backup RAM or an EEPROM for storing the memory information regardless of presence/absence of power supply to the ECU 12.

If the answer to any of Steps S30, S32, S34 and S36 of FIG. 10 or Steps S52, S54 and S58 of FIG. 11 is NO or if the process at Step S62 of FIG. 11 is completed, a series of the processing steps ends once.

If the learning value $LV_i$ is thus calculated, the pilot fuel injection is performed based on the learning value $LV_i$. The command fuel injection amount of the pilot injection is calculated based on the rotation speed of the crankshaft 6, an operation amount of the accelerator pedal and the learning value $LV_i$. A detail of the processing in regard to calculation of the command fuel injection amount of the pilot injection may be the same as the description in JP-A-2003-254139.

For example, following effects can be obtained according to the first embodiment.

(1) The learning value of pilot fuel injection in the D range is calculated by using a difference in fuel injection amount during the idling stabilization control between the P range and the D range. Thus, the learning value is calculated based on a difference between a command injection amount of the pilot learning control and a standard command injection amount, from which a difference caused by a difference between a load of the crankshaft 6 during the pilot learning control and a load expected with the standard command fuel injection amount is eliminated.

(2) A pattern in which injection amounts of predetermined multi-step injections are substantially equal to each other is used as a fuel injection pattern during the pilot learning control. Therefore, the injection amounts of the respective injections are set minute while the respective injections contribute equally to a change of the rotation state.

(3) The pilot learning control is performed when the shift position is in the D range. Therefore, a sufficient learning frequency of the learning value can be ensured.

(4) The learning of the learning value is allowed when the difference in the oil temperature during the idling stabilization control between the D range and the P range of the shift position is within a predetermined range. Therefore, deterioration in detection accuracy of the load of the crankshaft 6 due to the fluctuation of the oil temperature is inhibited.

(5) The learning of the learning value is allowed when the time difference between timings for storing the fuel injection amount during the idling stabilization control between the D range and the P range of the shift position is within a predetermined range. Therefore, deterioration in detection accuracy of the load of the crankshaft 6 due to degradation of the operating oil is inhibited.

(6) The learning of the learning value is allowed when a difference between oil temperature during the pilot learning control and oil temperature at the time of storing the fuel injection amount in the idling stabilization control is within a predetermined range. Therefore, deterioration in learning accuracy of the learning value due to the fluctuation in the oil temperature is inhibited.

(7) The learning of the learning value is allowed when a time difference between timing of pilot learning control and timing of storing the fuel injection amount in the idling stabilization control is within a predetermined range. Therefore, deterioration in learning accuracy of the learning value due to degradation in the operating oil is inhibited.

(8) The pilot learning control is performed when a vehicle is at a stop (driving wheels are at a stop). Therefore, deterioration in learning accuracy of the learning value due to the fluctuation in the load applied to the driving wheels is inhibited.

Next, a second example embodiment of the present invention will be explained with reference to FIG. 12, focusing on differences of the present embodiment from the first example embodiment. According to the present embodiment, the ECU 12 performs cruise control for driving a vehicle at constant speed when the user interface 20 instructs to perform cruise control. Further, the ECU 12 performs pilot learning control during this duration.

Figure 12:
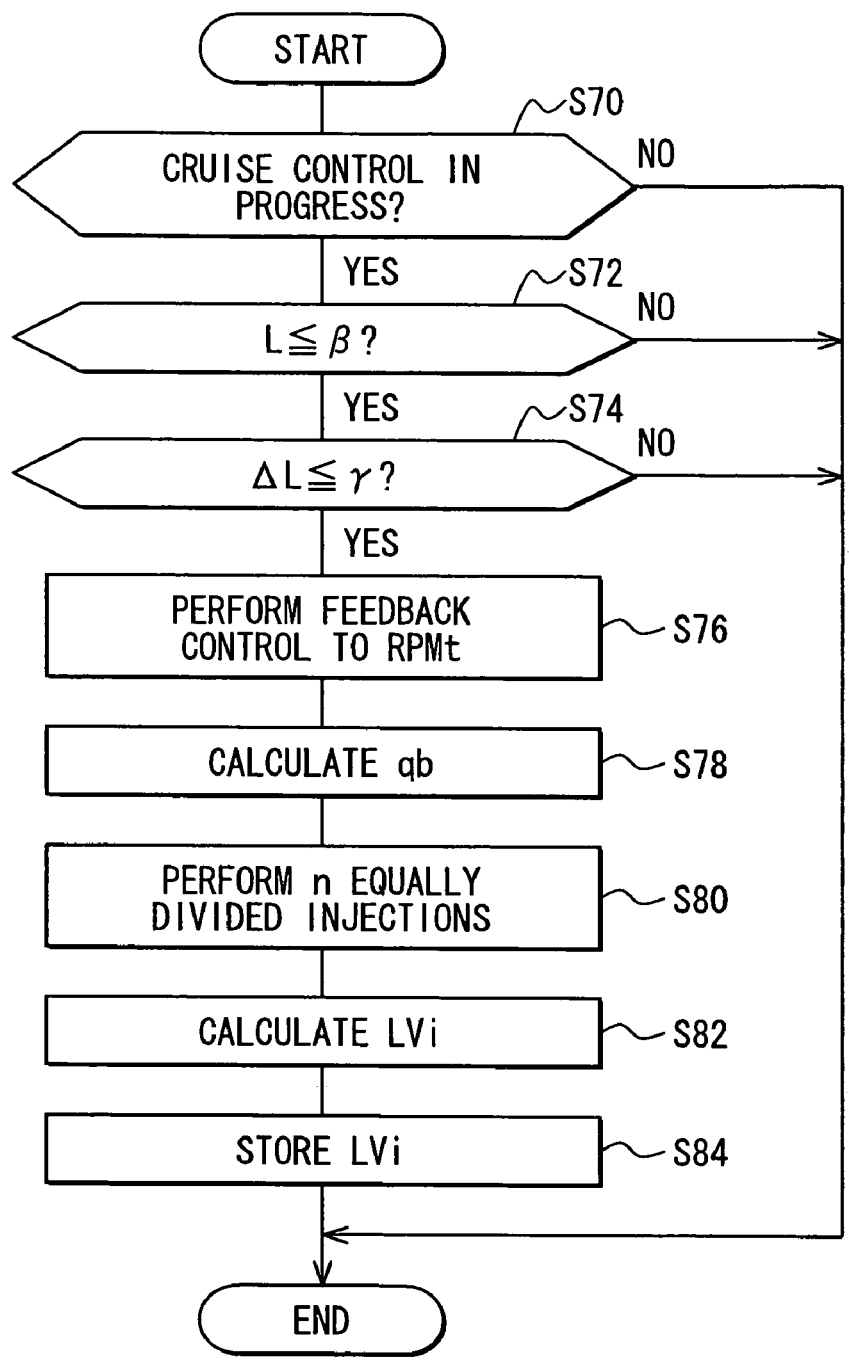
FIG. 12 is a flowchart showing processing steps of pilot learning control according to a second example embodiment of the present invention.

FIG. 12 shows processing steps of the pilot learning control of the present embodiment. The ECU 12 repeatedly executes this processing, for example, in a predetermined cycle. First, in a series of the processing steps, Step S70 determines whether the cruise control is in progress. Then, Step S72 determines whether a load L of the engine 2 is equal to or less than a predetermined value $\beta$. For example, Step S72 determines whether a condition that a command fuel injection amount required by the cruise control is equal to or less than a predetermined value is met. The determination at Step S72 is performed because approximation of a fuel injection amount to that of a minute amount injection such as a pilot injection by dividing a basic fuel injection amount required for constant running into equal n divisions is difficult when the command fuel injection amount is too large. The condition may include a condition that an in-vehicle air conditioner is not working or a headlight is not working in order to avoid a situation in which other load than the load of the driving wheels is applied to the crankshaft 6.

If the answer to Step S72 is YES, Step S74 determines whether a fluctuation $\Delta L$ of the load L is equal to or less than a predetermined value $\gamma$. Thus, it is determined whether a road surface on which a vehicle is running is smooth. If the answer to Step S74 is YES, Step S76 performs feedback control to target rotation speed RPMt. The target rotation speed RPMt is set as such a value as not to interrupt constant speed running.

Then, Step S78 calculates a basic injection amount qb for maintaining the target rotation speed RPMt while performing the pilot learning control. In detail, the basic fuel injection amount qb may be calculated as below.

A first injection amount required in the feedback control of the rotation speed of the crankshaft 6 to target rotation speed when a vehicle runs through cruise control on a flat road constantly at a certain speed under a condition of no wind is beforehand obtained through experiments or the like. The first injection amount includes a fuel amount for canceling out standard torque with which driving wheels restrict rotation of the crankshaft 6. The standard torque is torque expected in the above operating condition.

A second injection amount that is required in the feedback-control of the rotation speed of the crankshaft 6 to the target rotation speed and that required by a fuel injection pattern of the pilot learning control shown in FIG. 6 when the vehicle runs constantly at a certain speed under the cruise control on a flat road in a condition of no wind is beforehand obtained through experiments or the like. The second injection amount includes a fuel amount for canceling out the standard torque with which driving wheels restrict rotation of the crankshaft 6.

An injection amount (basic injection amount qb) necessary for maintaining the constant speed running of the vehicle with the fuel injection pattern for the above pilot learning control in the present running state of the vehicle is calculated from a difference between the present command injection amount (in detail, a total command fuel injection amount of the pilot injection and the main injection or the like) and the first fuel injection amount, and the second fuel injection amount. The fuel injection amount qb includes a fuel amount for canceling out the standard torque with which drive wheels restrict rotation of the crankshaft 6 in the present running state.

Then, Step S80 performs the fuel injections of the amounts obtained by dividing the basic fuel injection amount qb into n divisions like Step S46 of FIG. 11. In detail, the learning value already obtained is added to the divided fuel injection amounts. Then, Step S82 calculates a present learning value $LV_i$ by subtracting a value qb/n obtained by dividing the basic fuel injection amount qb by n from the command fuel injection amount required in the feedback control. Then, Step S84 stores the learned learning value $LV_i$ in the nonvolatile memory. The learning of the learning value Li should be preferably performed for multiple different values of fuel pressure supplied to the fuel injection valves 4. A series of the processing steps ends once when the answer to any of Steps S70, S72 and S74 is NO or when the process at step S84 is completed.

According to the second embodiment as described above, the following effect (9) is exerted in addition to the effect similar to the above effect (1) of the first embodiment.

(9) A sufficient learning frequency of the learning value can be ensured by performing the pilot learning control when driving wheels are rotating.

The above example embodiments as described above may be modified as below.

The load expected with the standard command fuel injection amount in the first example embodiment may be a load expected in the N range instead of the load expected in the P range. In this case, it is preferable for a car dealer to perform control for fixing the shift position at the N range during vehicle checking at the car dealer because a user seldom fixes the shift position in the N range.

The load expected with the standard command injection amount in the first example embodiment is not limited to the load expected in the P range or N range. In the case where a standard command fuel injection amount for an arbitrary load is set, a learning value can be learned based on a difference between the arbitrary load and a load during the idling stabilization control in the D range. In this case, however, it should be preferably reflected in learning control of the learning value in advance that a load applied to the crankshaft 6 by the torque converter 8 differs depending on the kind of the operating oil (the kind of the fluid in a fluid friction connecting portion) and the amount of the operating oil (fluid amount) filled in the converter 8. In the case of using a difference between the load expected with the standard command fuel injection amount and the load in the D range as described in the first example embodiment, the influence of the kind or the amount of the operating oil on the learning of the learning value can be eliminated.

In addition to the D range in the first example embodiment, fuel injection for pilot learning control may be further carried out in the P range to learn a learning value for pilot fuel injection. Since the P range provides a smaller number of factors causing load fluctuations than the D range, this learning can improve learning accuracy of the learning value. Further, a standard command fuel injection amount in the N range instead of the P range may be defined and also in the N range, learning a learning value for pilot fuel injection or the like may be carried out.

As for fuel injection having a pattern in which a relative relation between the number of fuel injection steps and the fuel injection amounts of the injection steps is preset, fuel injection amounts of multiple divided injection steps are not limited amounts equal to each other. That is, it is required only to properly learn a learning value in the pilot fuel injection or the like by setting the above pattern arbitrarily.

Not only a pilot fuel injection but also any fuel injection may be employed as an object of learning a learning value. In the case of minute amount injection such as post fuel injection for regenerating a post treatment device of a diesel particulate filter or the like or the pilot injection, it is difficult to accurately learn a learning value in usual fuel injection control including main fuel injection. Therefore, it is particularly effective to learn a learning value by setting the above pattern for the learning.

The connecting device for connecting driving wheels to the crankshaft 6 is not limited to the automatic transmission. For example, a manual transmission may be used.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. A fuel injection controller of an internal combustion engine connectable with driving wheels through a connecting device, the fuel injection controller learning a learning value of an operation amount of a fuel injection valve to compensate for a difference between a desired fuel injection amount and an actual fuel injection amount during control of fuel injection of the fuel injection valve, the fuel injection controller comprising:

a learning control device that feedback-controls a rotation state of an output shaft of the engine to a target rotation state by performing the fuel injection with a preset pattern in which a relation between the number of multiple injection steps and fuel injection amounts of the respective injection steps is preset;

a load sensor that senses a load applied to the output shaft by the connecting device based on a behavior of the output shaft accompanying the fuel injection with a pattern different from the preset pattern;

a memory that stores processing information for learning the learning value based on a difference between the operation amount required in the feedback control performed by the learning control device and a standard operation amount, the difference being reduced by its component caused by a difference between the load applied to the output shaft by the connecting device during the feedback control and a load expected with the standard operation amount:

a determination device that determines whether there exists a certain state in which a load substantially equal to the load applied to the output shaft by the connecting device during the feedback control is applied to the output shaft; and a learning device that learns the learning value by reflecting a sensing result, which is sensed by the load sensor when the determination device determines that the certain state exists, in the processing information;

wherein the connecting device includes a fluid friction connecting portion connected to the output shaft and an automatic transmission mechanism for changing rotation speed of an output of the fluid friction connecting portion in accordance with a shift position thereof; and the determination device determines that the certain state exists when the automatic transmission mechanism is in a shift position at which the feedback control is performed;

the learning control device performs the feedback control when the shift position is in a drive range.

2. The fuel injection controller as in claim 1, wherein the load expected with the standard operation amount includes a load applied to the output shaft when the shift position is in either one of a parking range and a neutral range, the load sensor includes a rotation control device that feedback-controls rotation speed of the output shaft to target rotation speed by performing the fuel injection with a pattern different from the preset pattern, and the load sensor employs a difference between the operation amount required by the rotation control device when the shift position is in the drive range and the operation amount required by the rotation control device when the shift position is in the parking range or the neutral range as the sensing result.

3. The fuel injection controller as in claim 2, further comprising:
a result taking device that takes in a sensing result of a sensor for sensing temperature of a fluid in the fluid friction connecting portion or a value equivalent to the fluid temperature, wherein
the load sensor employs the difference in the operation amount as the sensing result if a difference between the temperature or the equivalent value during the feedback control performed by the rotation control device when the shift position is in the drive range and the temperature or the equivalent value during the feedback control performed by the rotation control device when the shift position is in the parking range or the neutral range is within a predetermined range.

4. The fuel injection controller as in claim 2, wherein
the load sensor includes a fluid degradation sensor for sensing a degree of degradation of the fluid, and
the load sensor employs the difference in the operation amount as the sensing result if a difference between the degree of the degradation sensed when the shift position is in the drive range and the degree of the degradation sensed when the shift position is in the parking range or the neutral range is within a predetermined range.

* * * * *